US010454111B2

(12) United States Patent
Matsuzaki

(10) Patent No.: US 10,454,111 B2
(45) Date of Patent: Oct. 22, 2019

(54) ELECTRODE FOR NONAQUEOUS ELECTROLYTE SECONDARY BATTERY, METHOD OF MANUFACTURING SAME, AND NONAQUEOUS ELECTROLYTE SECONDARY BATTERY

(71) Applicant: TOAGOSEI CO., LTD., Tokyo (JP)

(72) Inventor: Hideo Matsuzaki, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 186 days.

(21) Appl. No.: 15/315,820

(22) PCT Filed: Jun. 3, 2015

(86) PCT No.: PCT/JP2015/066061

§ 371 (c)(1),
(2) Date: Dec. 2, 2016

(87) PCT Pub. No.: WO2015/190367

PCT Pub. Date: Dec. 17, 2015

(65) Prior Publication Data

US 2017/0104215 A1 Apr. 13, 2017

(30) Foreign Application Priority Data

Jun. 10, 2014 (JP) ................................ 2014-119214

(51) Int. Cl.

| | |
|---|---|
| ***H01M 4/62*** | (2006.01) |
| ***H01M 4/139*** | (2010.01) |
| ***H01M 4/04*** | (2006.01) |
| ***H01M 4/13*** | (2010.01) |
| *H01M 10/0525* | (2010.01) |

(52) U.S. Cl.

CPC ............. *H01M 4/62* (2013.01); *H01M 4/043* (2013.01); *H01M 4/0404* (2013.01); *H01M 4/13* (2013.01); *H01M 4/139* (2013.01); *H01M 4/628* (2013.01); *H01M 10/0525* (2013.01)

(58) Field of Classification Search

CPC ........... H01M 10/0525; H01M 4/0404; H01M 4/043; H01M 4/13; H01M 4/139; H01M 4/62; H01M 4/628

See application file for complete search history.

(56) References Cited

U.S. PATENT DOCUMENTS

2006/0151318 A1 7/2006 Park et al.
2006/0192326 A1 8/2006 Matsunaga et al.
2008/0226984 A1* 9/2008 Lee .................... H01M 4/0404 429/207
2009/0023065 A1 1/2009 Hwang et al.
2009/0220817 A1 9/2009 Kato et al.
2011/0015364 A1* 1/2011 Hibino ...................... C08F 2/32 526/348
2011/0021712 A1* 1/2011 Gotou ...................... C08F 2/32 525/319
2011/0040060 A1* 2/2011 Gotou ...................... C08F 2/32 526/348
2011/0046329 A1* 2/2011 Gotou ...................... C08F 2/32 526/229
2014/0151609 A1* 6/2014 Oguro .................. H01M 4/131 252/506
2014/0154563 A1* 6/2014 Oguro .................. H01M 4/366 429/211
2014/0308582 A1 10/2014 Satow et al.

FOREIGN PATENT DOCUMENTS

| | | | |
|---|---|---|---|
| JP | 2002-50360 | A | 2/2002 |
| JP | 2002-304986 | A | 10/2002 |
| JP | 2004-262747 | A | 9/2004 |
| JP | 2006-196457 | A | 7/2006 |
| JP | 2009-26760 | A | 2/2009 |
| JP | 2009-80971 | A | 4/2009 |
| JP | 2009-209190 | A | 9/2009 |
| JP | 2010-205517 | A | 9/2010 |
| JP | 2011-134691 | A | 7/2011 |
| WO | WO 2013/076996 | A1 | 5/2013 |

OTHER PUBLICATIONS

International Search Report, issued in PCT/JP2015/066061, PCT/ISA/210, dated Sep. 1, 2015.
Written Opinion of the International Searching Authority, issued in PCT/JP2015/066061, PCT/ISA/237, dated Sep. 1, 2015.
Chinese Office Action dated May 8, 2019, for corresponding Chinese Application No. 201580030605.8, with partial English translation.

* cited by examiner

*Primary Examiner* — Carlos Barcena

(74) *Attorney, Agent, or Firm* — Birch, Stewart, Kolasch & Birch, LLP

(57) ABSTRACT

A nonaqueous electrolyte secondary battery electrode is obtained by coating and drying a slurry including an active material, a crosslinking water-absorbing resin particle, a binder, and water, on a current collector surface to form a mixture layer and then compressing the mixture layer, and a nonaqueous electrolyte secondary battery includes the electrode, a separator, and a nonaqueous electrolytic solution.

9 Claims, 1 Drawing Sheet

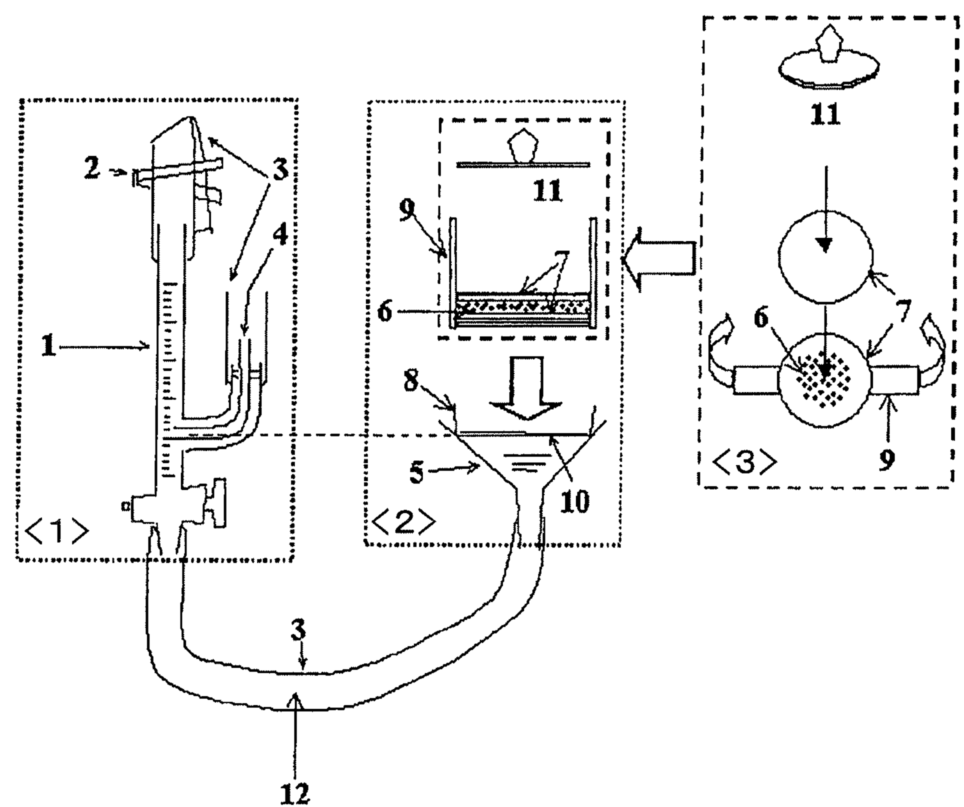
1
2
3
3
4
<1>
9
11
7
6
8
5
10
<2>
11
6
7
9
<3>
3
12

ELECTRODE FOR NONAQUEOUS ELECTROLYTE SECONDARY BATTERY, METHOD OF MANUFACTURING SAME, AND NONAQUEOUS ELECTROLYTE SECONDARY BATTERY

TECHNICAL FIELD

The present invention relates to a nonaqueous electrolyte secondary battery electrode for lithium ion secondary batteries and the like, and a method of manufacturing the electrode.

BACKGROUND ART

For example, lithium ion secondary batteries are well known as nonaqueous electrolyte secondary batteries. Lithium ion secondary batteries are excellent in energy density, output density, charge/discharge cycle characteristics, and the like as compared to other secondary batteries such as lead storage batteries. Thus, lithium ion secondary batteries are employed in mobile terminals such as smart phones, tablet terminals, and notebook PCs, and contribute to downsizing, weight reduction, and high performance of such terminals. On the other hand, as secondary batteries for electric automobiles and hybrid automobiles (secondary batteries for use in automobiles), lithium ion secondary batteries are not yet developed enough to deliver high performance in terms of output, time necessary for charging, and the like. Accordingly, aiming at high output and charging time reduction in nonaqueous electrolyte secondary batteries, studies for improving charge and discharge characteristics at high current density are underway.

A nonaqueous electrolyte secondary battery includes a pair of electrodes arranged via a separator and a nonaqueous electrolytic solution. The electrodes include a current collector and a mixture layer formed on the surface of the current collector. The mixture layer is formed by coating a slurry including an active material, a binder, and the like on the current collector, drying the slurry, and the like. In general, the obtained mixture layer is subjected to a treatment, such as compression, so that electrode density is increased, whereby electric capacitance of the battery is increased for use.

In the case of a lithium ion secondary battery as a nonaqueous electrolyte secondary battery, lithium ions move from the positive electrode to the negative electrode during charging, and move from the negative electrode to the positive electrode during discharging. When current density during charging and discharging increases, the amount of the lithium ions that move per unit time between the positive and negative electrodes increases. Lithium ions usually move in an electrolyte present in gaps between densely-filled active material particles, and therefore migrate and diffuse through extremely narrow and winding paths. Due to this, the increased current density during charging and discharging causes a phenomenon in which migration and diffusion of the lithium ions are delayed with respect to the amount of current and the ions are not supplied to the entire active material. The phenomenon particularly tends to occur on a current collector side. In addition, similarly in a nonaqueous solvent included in the electrolyte, the migration and diffusion of the lithium ions also become insufficient with respect to the amount of current, thereby causing a phenomenon (electrolytic solution depletion) in which a shortage of nonaqueous solvent molecules that are to be coordinated to the lithium ions on an active material surface occurs. As a result of these phenomena, a problem arises in that effective capacity becomes small when the current density increases.

Furthermore, in the negative electrode, when charge current density increases, some of the lithium ions cannot react with the active material and are deposited as metal lithium on the surface of the negative electrode, whereby negative electrode characteristics are deteriorated, causing a problem with reduced battery life.

In order to prevent the problems and enable charging and discharging at high current density, i.e., increase output density, it is effective to increase the speed and amount of absorption of the electrolytic solution (a retained amount of the solution) and make a structure that facilitates the migration and diffusion of the lithium ions by securing the gaps in the active material layer by electrode porosification.

Patent Document 1 discloses an electrochemical battery electrode obtained by adjusting porosity using a thermally decomposable pore-forming material, such as diammonium carbonate. Additionally, Patent Document 2 describes a nonaqueous electrolyte secondary battery electrode having pores formed in a mixture layer formed from a slurry including an active material, a first binder, and a second binder by compressing the mixture layer and then heating the compressed mixture layer to thermally decompose a part of the binders. Patent Document 3 discloses a method of manufacturing a lithium secondary battery electrode including the steps of coating a slurry including an active material, a binding agent, and a resin partially compatible with the binding agent on a current collector surface and drying the slurry.

CITATION LIST

Patent Documents

Patent Document 1: Japanese Patent Application Laid-Open (JP-A) No. 2006-196457

Patent Document 2: JP-A No. 2011-134691

Patent Document 3: JP-A No. 2010-205517

SUMMARY OF THE INVENTION

Problems to be Solved by the Invention

However, the electrode described in Patent Document 1 is obtained by a manufacturing method including a step of coating an electrode active material, the pore-forming material, and the like on a current collector surface, a step of rolling the coated electrode, and furthermore, a step of burning the rolled electrode after going through the steps. Thus, improvement has been desired in terms of productivity and energy cost. The electrode described in Patent Document 2 also needs a step of thermally decomposing the binders by heating (or burning) after compressing the mixture layer including the active material layer, and therefore has had the same problems as in Patent Document 1. Furthermore, in both Patent Documents 1 and 2, a pore-forming component is removed by thermal decomposition or the like after compressing the active material containing layer. Thus, the mixture layer has had insufficient strength, and durability of the electrode has also been a matter of concern.

On the other hand, according to the manufacturing method described in Patent Document 3, an electrode including a mixture layer made porous can be obtained without going through the step of heating (or burning) after rolling of the mixture layer. However, the method uses a resin partially compatible with a binding agent, and allows porous portions to be formed by aggregating a phase of the resin when drying a slurry-coated film and evaporating a solvent contained in the aggregated resin phase. Due to this, the state of aggregation of the resin phase (the state of phase separation) changes depending on the binding agent and solvent used, conditions for coating and drying of the slurry, and the like. Thus, the method has a problem in that it is difficult to stably form desired pores in a mixture layer.

The present invention has been accomplished in view of such circumstances, and is directed to improve the current density of a battery and solve the problems relating to the strength of a mixture layer and the durability and productivity of an electrode. Specifically, it is an object of the invention to provide a nonaqueous electrolyte secondary battery electrode that is an electrode obtainable without going through any step of heating (burning) or the like after compressing a mixture layer and that is excellent in the speed of absorption of an electrolytic solution and the amount of retention thereof, a nonaqueous electrolyte secondary battery using the electrode, and a method of manufacturing the nonaqueous electrolyte secondary battery electrode.

Solution to the Problems

As a result of intensive and extensive studies to solve the above problems, the present inventor found that formation of a mixture layer by using a specific crosslinking water-absorbing resin particle allows pores to be formed in the mixture layer without performing any heating (burning) treatment after compressing the mixture layer, as a result of which the speed of absorption of an electrolytic solution and the amount of retention thereof can be increased, thereby completing the invention.

Specifically, a first invention is a nonaqueous electrolyte secondary battery electrode including a mixture layer formed from a slurry including an active material, a crosslinking water-absorbing resin particle, a binder, and water, on a current collector surface.

A second invention is the nonaqueous electrolyte secondary battery electrode according to the first invention, in which the crosslinking water-absorbing resin particle has an amount of water absorption of from 3 to 100 ml/g.

A third invention is the nonaqueous electrolyte secondary battery electrode according to the first invention or the second invention, in which the crosslinking water-absorbing resin particle includes an ionic functional group in an amount of from 0.5 to 15 mmol/g.

A fourth invention is the nonaqueous electrolyte secondary battery electrode according to any of the first invention through the third invention, in which a value (D/L) calculated from a particle size (D) of the crosslinking water-absorbing resin particle saturated and swollen with ion exchange water and a mixture layer thickness (L) is in a range of from 0.01 to 2.0.

A fifth invention is a nonaqueous electrolyte secondary battery including the nonaqueous electrolyte secondary battery electrode according to any of the first invention to the fourth invention, a separator, and a nonaqueous electrolytic solution.

A sixth invention is a method of manufacturing a nonaqueous electrolyte secondary battery electrode, the method including the steps of: coating a slurry including an active material, a crosslinking water-absorbing resin particle, a binder, and water, on a current collector surface; drying the slurry to form a mixture layer; and then compressing the formed layer.

Advantageous Effects of Invention

The nonaqueous electrolyte secondary battery electrode of the invention is excellent in speed of absorption of an electrolytic solution and in performance of retention thereof. Thus, the nonaqueous electrolyte secondary battery including the electrode can improve the current density thereof.

In addition, in the method of manufacturing a nonaqueous electrolyte secondary battery electrode according to the invention, it is unnecessary to perform a step of heating (burning) after compressing the mixture layer. Thus, the manufacturing method is advantageous in terms of cost of electrode production.

BRIEF DESCRIPTION OF DRAWING

The FIGURE is a diagram showing a device for use in measurement of the amount of water absorbed by a crosslinking water-absorbing resin particle.

DESCRIPTION OF EMBODIMENTS

Hereinafter, the present invention will be described in detail. As used herein, "(meth)acrylic" means acrylic and/or methacrylic, and "(meth)acrylate" means acrylate and/or methacrylate. Additionally, "(meth)acryloyl group" means acryloyl group and/or methacryloyl group.

A nonaqueous electrolyte secondary battery electrode of the present invention includes a mixture layer formed from a slurry including an active material, a crosslinking water-absorbing resin particle, a binder, and water, on a current collector surface made of copper, aluminum, or the like. The slurry may include a conductive agent, an organic solvent, and the like as other components.

Detailed descriptions of the components included in the mixture layer, a method of forming the mixture layer, and the like will be given below.

<Active Material>

As a positive electrode active material, for example, a lithium-containing metal oxide having a layer structure or a spinel structure can be used. Specific examples of the compound include lithium cobaltate, lithium manganate, lithium nickelate, and lithium iron phosphate. As the positive electrode active material, the compounds described above may be used singly or in mixture or composite of two or more kinds thereof.

Examples of a negative electrode active material include a carbon material, a lithium metal, a lithium alloy, and a metal oxide, and these materials may be used singly or in combination of two or more kinds thereof. In the case of using a lithium alloy, the lithium alloy preferably includes one or more elements selected from silicon, tin, magnesium, aluminum, or zinc. The percentage of elements other than lithium in the lithium alloy is preferably in a range of from 3 to 50% by weight. In the case of using a metal oxide, the oxide preferably includes one or more elements selected from silicon or tin.

<Crosslinking Water-Absorbing Resin Particle>

The crosslinking water-absorbing resin particle acts as a pore-forming agent for making the mixture layer porous.

In the present invention, the mixture layer is formed by coating a slurry including an active material, a crosslinking water-absorbing resin particle, and the like on the current collector surface and drying the slurry. The crosslinking water-absorbing resin particle is present in the slurry in a water-absorbed state. In the step of drying the slurry, water not absorbed by the crosslinking water-absorbing resin particle (water present in a matrix portion) in the slurry preferentially evaporates. This is due to hydrophilicity and water-retaining properties of the crosslinking water-absorbing resin particle, as a result of which surroundings of the crosslinking water-absorbing resin particle in the water-absorbed state are fixed. Accordingly, while the water in the crosslinking water-absorbing resin particle also evaporates as the drying further proceeds, pores corresponding to the evaporated water are formed since the surroundings of the particle are fixed. In addition, the pores remain even after rolling the mixture layer, whereby an electrode including the mixture layer made porous can be obtained without going through any step of heating (burning) or the like after rolling.

The crosslinking water-absorbing resin particle can be obtained by polymerizing a radically polymerizable hydrophilic vinyl monomer by a known polymerization method such as solution polymerization, suspension polymerization, or bulk polymerization, and if necessary, drying and pulverizing the polymerized product. Preferred is an inverse suspension polymerization method since a crosslinking water-absorbing resin particle having a micron-sized spherical shape is easily obtainable. Due to the spherical form, spherical pores are formed, so that the pores can be easily maintained even in the rolling treatment, and the strength of the mixture layer after having been compressed is also increased.

In the inverse suspension polymerization method, a resin particle can be produced by a w/o type suspension polymerization in which a water phase (an aqueous solution of a hydrophilic vinyl-based monomer) is suspended in a water droplet form in an oil phase in the presence of a dispersion stabilizer.

Specific examples of the dispersion stabilizer include macromonomer type dispersion stabilizers and nonionic surfactants such as sorbitan fatty acid esters, polyglycerol fatty acid esters, sucrose fatty acid esters, sorbitol fatty acid esters, and polyoxyethylene alkyl ethers.

Among these, macromonomer type dispersion stabilizers are preferably used. Macromonomer type dispersion stabilizers have a radically polymerizable unsaturated group at some point or an end of a polymer chain derived from a vinyl-based monomer.

In addition, a macromonomer type dispersion stabilizer is preferably used in combination with relatively highly hydrophobic nonionic surfactants having an HLB of from 3 to 8, such as sorbitan monooleate and sorbitan monopalmitate, and these may be combined singly or may be used in combination of two or more kinds thereof.

Preferably, the dispersion stabilizer is dissolved or uniformly dispersed in a hydrophobic organic solvent that forms a dispersion medium (an oil phase) and added to a polymerization system.

The dispersion stabilizer is used in an amount of preferably from 0.1 to 50 parts by mass, more preferably from 0.2 to 20 parts by mass, and yet more preferably from 0.5 to 10 parts by mass, with respect to 100 parts by mass as the total of vinyl-based monomers in order to obtain a crosslinking water-absorbing resin particle uniform in particle size while maintaining a favorable dispersion stability. When the amount of the dispersion stabilizer used is too small, the dispersion stabilities of the vinyl-based monomers and the produced polymer particle in the polymerization system become poor, which easily causes aggregation between the produced polymer particles, sedimentation of the particles, and variation in particle size. On the other hand, when the amount of the dispersion stabilizer used is too large, the amount of production of byproduct particles (equal to or less than 1 μm) can increase.

A structural unit as a component of the crosslinking water-absorbing resin particle of the invention can be any one as long as a structural unit constituted from the above-described radically polymerizable hydrophilic vinyl-based monomer, and is not particularly limited. For example, a hydrophilic vinyl-based monomer can be used that has a hydrophilic group such as a carboxyl group, an amino group, a phosphate group, a sulfonate group, an amide group, a hydroxyl group, or a quaternary ammonium group. Preferred are hydrophilic vinyl-based monomers having a carboxyl group, a sulfonate group, an amino group, and an amide group among the groups, since a crosslinking water-absorbing resin particle can be obtained that is highly hydrophilic and excellent in water-absorbing performance and water-retaining performance.

The crosslinking water-absorbing resin particle used in the invention includes an ionic functional group in an amount of preferably from 0.5 to 15 mmol/g, and more preferably from 2.0 to 12 mmol/g. When the amount of the ionic functional group is 0.5 mmol/g or more, sufficient dispersibility into water can be ensured, thus enabling the particle to be stably dispersed without forming any aggregate in the slurry. In addition, the necessary water-absorbing properties and solution-retaining properties can be ensured. On the other hand, due to the structural unit included in the water-absorbing resin particle, the water-absorbing resin particle has a maximum amount of approximately 15 mmol/g of the ionic functional group.

The ionic functional group is preferably neutralized. Neutralization can be made using an alkali such as ammonia, an organic amine, or an alkali metal hydroxide. Preferred is ammonia since ammonia can be removed during drying. The neutralization ratio of the ionic functional group is in a range of preferably from 10 to 100% by mol, and more preferably from 20 to 80% by mol.

Specific examples of the hydrophilic vinyl-based monomers include vinyl-based monomers having a carboxylic group such as (meth)acrylic acid, crotonic acid, itaconic acid, maleic acid, fumaric acid, monobutyl itaconate, monobutyl maleate, or cyclohexanedicarboxylic acid, or (partially) alkali-neutralized products thereof; vinyl-based monomers having an amino group such as N,N-dimethylaminoethyl (meth)acrylate, N,N-diethylaminoethyl (meth)acrylate, N,N-dimethylaminopropyl (meth)acrylate, or N,N-dimethylaminopropyl (meth)acrylamide, or (partially) acid-neutralized products thereof, or (partially) quaternized products thereof; N-vinylpyrrolidone, acryloylmorpholine; vinyl-based monomers having a phosphate group such as acid phosphoxyethyl methacrylate, acid phosphoxypropyl methacrylate, or 3-chloro-2-acid phosphoxypropyl methacrylate, or (partially) alkali-neutralized products thereof; vinyl-based monomers having a sulfonate group or phosphonate group, such as 2-(meth)acrylamide-2-methylpropane sulfonate, 2-sulfoethyl(meth)acrylate, 2-(meth)acryloylethane sulfonate, allyl sulfonate, styrene sulfonate, vinyl sulfonate, allyl phosphonate, or vinyl phosphonate, or (partially) alkali-neutralized products thereof; and nonionic hydrophilic monomers such as (meth)acrylamide, N,N-dimethyl acrylamide, N-isopropyl acrylamide, N-methylol (meth)acrylamide, N-alkoxymethyl (meth)acrylamide, (meth)acrylonitrile, hydroxyethyl (meth)acrylate, and hydroxypropyl (meth)acrylate. These compounds can be used singly or in combination of two or more kinds thereof.

It is preferable to perform inverse suspension polymerization by using, among these examples, one kind or two or more kinds of (meth)acrylic acid, (meth)acrylamide, and 2-acrylamide-2-methylpropane sulfonate in terms of excellent polymerizability and excellent water-absorbing properties of a resin particle obtained. Acrylic acids or any combination of acrylic acid and acrylamide are particularly preferable in that the compounds include no characteristics for thermally decomposing a produced polymer and no poisoning elements (such as sulfur and phosphorous).

In addition, the crosslinking water-absorbing resin particle of the present invention is obtained by using, as a vinyl-based monomer, a multifunctional vinyl-based monomer having two or more radically polymerizable unsaturated groups, together with one kind or two or more kinds of the above-mentioned monofunctional hydrophilic vinyl-based monomers.

The multifunctional vinyl-based monomer can be any one as long as the monomer is a vinyl-based monomer that has two or more groups radically polymerizable with the above-mentioned hydrophilic vinyl-based monomers. Specific examples thereof include di- or tri(meth)acrylates of polyols, such as polyethylene glycol di(meth)acrylate, polypropylene glycol di(meth)acrylate, glycerin tri(meth)acrylate, trimethylolpropane tri(meth)acrylate, and trimethylolpropane ethylene oxide-modified tri(meth)acrylate, bisamides such as methylenebis(meth)acrylamide, divinyl benzene, and allyl (meth)acrylate. These compounds can be used singly or in combination of two or more kinds thereof.

Among these compounds, polyethylene glycol diacrylate and methylenebisacrylamide are preferably used as multifunctional vinyl-based monomers since the compounds are excellent in solubility into a mixed solution of a hydrophilic vinyl-based monomer(s) and water, and advantageous in increasing the amount of use in order to obtain high crosslinking density. Particularly preferred is polyethylene glycol di(meth)acrylate.

The ratio of the multifunctional vinyl-based monomer to be used can vary depending on the kind(s) of vinyl-based monomer(s) to be used, the specifications of a desired electrode, and the like. The ratio thereof is preferably from 0.1 to 100 mol, more preferably from 0.2 to 50 mol, and yet more preferably from 0.5 to 10 mol, with respect to 100 mol as the total amount of monofunctional vinyl-based monomer (s) to be used.

A crosslinking water-absorbing resin particle obtained using the multifunctional vinyl-based monomer(s) can have appropriate water-absorbing properties and can maintain a stable water absorption state even in preparation and coating of the slurry, so that a designed porosity can be ensured. In addition, solvent resistance of the resin particle itself can also be improved.

In the present invention, the amount of ion exchange water absorbed by the crosslinking water-absorbing resin particle under ordinary pressure is in a range of preferably from 3 to 100 mL/g, and more preferably from 10 to 50 mL/g. When the amount of water absorption is 3 mL/g or more, sufficient pore-forming performance can be obtained, and when the water absorption amount is 100 mL/g or less, favorable coatability can be ensured.

Additionally, in the invention, a value of (D/L) calculated from an average particle size (D) of the crosslinking water-absorbing resin particle saturated and swollen with ion exchange water and a mixture layer thickness (L) is in a range of preferably from 0.01 to 2.0, and more preferably from 0.03 to 1.0. When the value of (D/L) is 0.01 or more, sufficient pore-forming performance can be obtained. On the other hand, when the value of (D/L) is 2.0 or less, a sufficient number of pores can be formed to obtain effects of improving migration and dispersibility of lithium ions, and also the pores can easily remain without being crushed even during compression.

Furthermore, when the crosslinking water-absorbing resin particle is saturated and swollen with ion exchange water, particles larger than L×4.25 including aggregates are contained in an amount of preferably 1.0% by mass or less, and more preferably 0.2% by mass or less. When the particle content is 1.0% by mass or less, problems such as occurrence of coating defects such as streaks and unevenness due to influence of the larger particles and deterioration of electrode performance due to formation of pin holes can be prevented.

In addition, in Examples that will be described later, electrodes including a mixture layer having a thickness of 100 μm (L=100) have been formed. In this case, particles larger than L×4.25, i.e., 425 μm are contained in an amount of preferably 1.0% by mass or less.

The amount of the crosslinking water-absorbing resin particle to be used is adjusted, if appropriate, according to an intended performance. The amount thereof is preferably in a range of from 0.1 to 10% by mass, and more preferably in a range of from 0.5 to 5% by mass, with respect to the amount of the active material. When the amount of the particle is 0.1% by mass or more, sufficient pore-forming performance can be exerted, and when the amount thereof is 10% by mass or less, negative influence to durability due to reduction in electrode strength, troubles during processing, and the like can be prevented.

<Binder>

As the above-described binder, a known electrode binder material can be used. Preferred is a high molecular compound that is dissolved in or swollen with water, or dispersed in water.

Examples of a binder that is dissolved in or swollen with water include poly(meth)acrylic acid (salt), (meth)acrylic acid/(meth)acrylate ester copolymer (salt), polyvinyl alcohol, polyethylene glycol, and carboxymethyl cellulose.

The binder may be used in combination with any of water-soluble or water-dispersible crosslinking agents such as a multifunctional epoxy compound, a multifunctional oxazoline compound, and a multifunctional carbodiimide compound. When used in combination with any crosslinking agent, the strength of the binder will improve, as a result of which electrode durability can be improved.

The amount of the binder to be used is preferably from 0.5 to 20 parts, and more preferably from 1 to 15 parts by mass, with respect to 100 parts by mass of the active material.

<Water>

In the present invention, the slurry for forming the mixture layer uses water as a medium. Alternatively, a mixture medium of water and a hydrophilic organic solvent may be used. Examples of the hydrophilic organic solvent include alcohols such as methanol and ketones such as acetone. The percentage of water in the mixture medium is preferably 50% by mass or more, and more preferably 70% by mass or more.

The amount of the medium including water in the entire slurry is in a range of preferably from 10 to 90% by weight, and more preferably from 30 to 70% by mass in terms of coatability of the slurry, energy cost necessary for drying, and productivity.

<Method of Manufacturing Electrode>

Next, a method of manufacturing the electrode will be described in detail. The nonaqueous electrolyte secondary battery electrode of the present invention can be manufactured by a method including, for example, the following steps 1 to 4.

Step (1): Prepare a slurry including an active material, a crosslinking water-absorbing resin particle, a binder, and water.

Step (2): Coat the slurry on a surface of a current collector.

Step (3): Dry the coated slurry to form a mixture layer.

Step (4): Compress the dried mixture layer.

As described above, in the present invention, an electrode can be obtained without additionally performing heating (burning) or the like after compressing a mixture layer.

In Step (1), a slurry is adjusted by mixing together an active material, a crosslinking water-absorbing resin particle, a binder, water, and the like. Components such as a conductive agent and an organic solvent may be added as other components. A method of the mixing is not particularly limited. A known stirrer can be used, and heating or the like may be performed, if necessary.

In Step (2), the slurry obtained above is coated on the current collector surface. A method of the coating is not particularly limited, and any of known methods can be employed, such as a doctor blade method, a dip method, a roll coat method, a comma coat method, a curtain coat method, a gravure coat method, and an extrusion method.

In Step (3), the slurry coated on the current collector surface is dried to remove a part of water or the entire water included in the slurry. As described above, here, water present in the matrix portion of the slurry preferentially evaporates, and after that, water included in the crosslinking water-absorbing resin particle evaporates, thereby forming pores in the mixture layer.

As a method of the drying, a known method such as hot air spraying, pressure reduction, (far) infrared ray, or microwave irradiation can be used. In this step, while the water may be completely removed, a part of the water may remain in an amount of approximately 10% by mass or less as long as the water does not negatively influence post-processes, such as rolling, winding up, and processing. In the case of allowing the water to remain, it is preferable to go through a step of removing the remaining water before injecting an electrolyte in manufacturing of the electrode.

A material temperature in drying is in a range of preferably from 60 to 250° C., and more preferably from 100 to 200° C. in terms of productivity and thermal deterioration of the materials.

In Step (4), the dried mixture layer is compressed by a die press, a roll press, and the like. Compression allows the active material and the binder to closely adhere to the current collector, so that the strength of the mixture layer and the adhesion thereto can be improved. In the present step, the thickness of the mixture layer is preferably adjusted to a thickness of approximately from 30 to 80% by compression, and the thickness of the compressed mixture layer is typically approximately from 4 to 200 μm.

<Nonaqueous Electrolyte Secondary Battery>

A nonaqueous electrolyte secondary battery of the invention will be described. The nonaqueous electrolyte secondary battery of the invention includes the nonaqueous electrolyte secondary battery electrode according to the invention, a separator, and a nonaqueous electrolytic solution.

The separator is arranged between a positive electrode and a negative electrode of the battery and has a role of preventing a short circuit due to contact between both electrodes and retaining the electrolytic solution to ensure ion conductivity. The separator is preferably a film-shaped insulating porous membrane that has favorable ion permeability and mechanical strength. Specific examples of a material usable for the separator include polyolefins, such as polyethylene and polypropylene, and polytetrafluoroethylene.

As for the nonaqueous electrolytic solution, a known one commonly used in nonaqueous electrolyte secondary batteries can be used. Specific examples of a solvent include cyclic carbonates having high permittivity and a high ability to dissolve an electrolyte, such as propylene carbonate and ethylene carbonate and chain carbonates having low viscosity, such as ethyl methyl carbonate, dimethyl carbonate, and diethyl carbonate. These can be used singly or as a mixture solvent thereof. The nonaqueous electrolytic solution is used by dissolving a lithium salt such as $LiPF_6$, $LiSbF_6$, $LiBF_4$, $LiClO_4$, or $LiAlO_4$ in any of these solvents.

The nonaqueous electrolyte secondary battery of the invention is obtained by forming a positive electrode plate and a negative electrode plate partitioned by a separator into a spiral shape or a layered structure and housing in a case or the like.

In the present specification, the particle size of polymer particle saturated and swollen with ion exchange water, the amount of water absorption of the polymer particle, and the ratio of particles having a particle size of 425 μm or more in a water-saturated and swollen state refer to values measured or obtained by methods described in the sections of the following Examples.

EXAMPLES

Hereinafter, the invention will be described in detail on the basis of the Examples. The invention is not limited to these Examples. Hereinbelow, "parts" and "%" mean parts by mass and % by mass, unless otherwise specified.

In the following Examples, evaluation on crosslinking water-absorbing resin particles was performed by the following methods.

(1) Solid Content

Approximately 1 g of a measurement sample was weighed (a), and next, a residue obtained after drying at 150° C. for 60 minutes by a windless dryer was measured (b), followed by calculation of a solid content from the following formula. The measurement was performed using a weighing bottle. Other operations were performed according to JIS K 0067-1992 (Test methods for loss and residue of chemical products).

$$\text{Solid content}(\%)=(b/a)\times 100$$

(2) Amount of Water Absorption

The amount of water absorption was measured by the following method. The FIGURE shows a measurement device.

The measurement device includes <1>, <2>, and <3> in the FIGURE.

<1> shows a burette 1 equipped with a branch tube for air ventilation, a pinch cock 2, a silicone tube 3, and a polytetrafluoroethylene tube 4.

<2> shows a support cylinder 8 that is placed on a funnel 5 and that has multiple holes formed in the bottom surface thereof, and a device filter paper 10 additionally placed thereon.

<3> shows a sample 6 of a polymer particle placed between two pieces of sample fixing filter paper 7, and an adhesive tape 9 for fixing the sample fixing filter paper. The pieces of the filter paper used are all ADVANTEC No. 2 having an inner diameter of 55 mm.

<1> and <2> are connected by the silicone tube 3.

The funnel 5 and the support cylinder 8 are located at a level fixed with respect to the burette 1, whereby the lower end of the polytetrafluoroethylene tube 4 placed in the burette branch tube and the bottom surface of the support cylinder 8 are set to be at the same level (a dotted line in the FIGURE).

The measurement method will be described below.

The pinch cock 2 in <1> is removed, and ion exchange water is fed from an upper portion of the burette 1 through the silicone tube 3 to obtain a state where a portion ranging from the burette 1 to the device filter paper 10 is filled with ion exchange water 12. Next, the pinch cock 2 is closed and air is removed from the polytetrafluoroethylene tube 4 connected to the burette branch tube by a rubber stopper. In this way, a state is obtained where the ion exchange water 12 is continuously supplied from the burette 1 to the device filter paper 10.

Next, extra ion exchange water 12 that has oozed out from the device filter paper 10 is removed, and then, a reading (a) on the scale of the burette 1 is recorded.

An amount of from 0.1 to 0.2 g of a dry powder of a measurement sample is weighed and uniformly placed at a center part of the sample fixing filter paper 7, as shown in <3>. The sample is sandwiched by another piece of filter paper, and the two pieces of filter paper are fixed by the adhesive tape 9 to fix the sample. The pieces of filter paper with the sample fixed therebetween are placed on the device filter paper 10 shown in <2>.

Next, after 30 minutes has passed from a time point when a lid 11 is placed on the device filter paper 10, a reading (b) on the scale of the burette 1 is recorded.

A total (c) of the amount of water absorption by the measurement sample and the amount of water absorption by the two pieces of sample fixing filter paper 7 is obtained by (a-b). With the same operation, the amount of water absorption by only the two pieces of filter paper 7 excluding the polymer particle sample is measured (d).

The above operations were performed and the amount of water absorption was calculated by the following formula. A solid content used for the calculation was a value measured by the method of (1).

$$\text{Amount of water absorption (mL/g)}=(c-d)/\{\text{Weight (g) of measurement sample}\times(\text{Solid content(\%) } 100)\}$$

(3) Water-Saturated and Swollen Particle Size

Twenty ml of ion exchange water was added to 0.02 g of a measurement sample, and thoroughly mixed by shaking to uniformly disperse the sample. In addition, in a dispersion solution obtained by performing dispersion for 30 minutes or more so that the particles were saturated and swollen with the ion exchange water, a particle size distribution was measured using a laser diffraction/scattering particle size distribution analyzer (MT-3000, manufactured by Nikkiso Co., Ltd.) after irradiating with ultrasonic wave for 1 minute. Ion exchange water was used as a circulating dispersion medium in the measurement, and the refractive index of the dispersion was set to 1.53. A median diameter (μm) was calculated from a volume-based particle size distribution obtained by the measurement, and was defined as a water-swollen particle size.

(4) Measurement of Amount of Particles Having Water-Swollen Particle Size of 425 or More (Wet Sieve Residue Method)

Measurement was performed according to JIS K 0069-1992 (Test methods of sieving chemical products).

An amount of a sample corresponding to 25 g as a solid content is weighed, and the same amount of ethanol is added thereto to loosen well. Then, the mixed solution is slowly poured into 3.01 of ion exchange water under stirring, and is stirred for 30 minutes to prepare a water-swollen dispersion solution of the sample. Next, after confirming uniform dispersion of the sample, the dispersion solution is poured into a sieve having a diameter of 70 mm and a mesh size of 425 μm and allowed to pass therethrough. Then, a residue on the sieve is washed with a sufficient amount of water carefully so that the residue does not spill out from the sieve. Next, the sieve after the measurement is dried at 150° C. for 30 minutes in a circulation drier, then allowed to cool in a desiccator, and the weight of the sieve after the drying (the weight of sieve+residue) is measured.

A wet sieve residue (%) calculated by the following formula was defined as the amount of particles having a water-swollen particle size of 425 μm or more. Operations other than those described above were performed according to JIS K 0069-1992 (Test methods of sieving chemical products).

$$\text{Wet sieve residue (\%)} = \frac{\text{Weight of sieve after test} - \text{Weight of sieve}}{\text{Weight of sample used} \times (\text{Solid content} \div 100)} \times 100$$

Production Example 0

Production of Macromonomer Composition UM-1

In a 1000-ml pressure stirring vessel reactor equipped with an oil jacket, the temperature of the oil jacket was maintained at 240° C.

A monomer mixture solution prepared in a ratio of 75.0 parts of lauryl methacrylate (hereinafter referred to as "LMA"), 25.0 parts of acrylic acid (hereinafter referred to as "AA") as monomers, 10.0 parts of methyl ethyl ketone as a polymerization solvent, and 0.45 parts of di-tertiary-butyl peroxide as a polymerization initiator was charged into a raw material tank.

The monomer mixture solution in the raw material tank started to be supplied into the reactor, and the supply of the monomer mixture solution and extraction of a reaction mixture solution were performed so that the content weight in the reactor would be 580 g and the average retention time would be 12 minutes. Adjustments were made so that the internal temperature of the reactor would be 235° C. and the inner pressure thereof would be 1.1 MPa. The reaction mixture solution extracted from the reactor is continuously supplied into a thin film evaporator depressurized to 20 kPa and maintained at 250° C., and is discharged as a macromonomer composition from which the monomers, the solvent, and the like have been distilled away. The distilled monomers, solvent, and the like were cooled by a condenser and collected as a distillate. A point in time when 60 minutes passed from a time at which the internal temperature of the reactor became stable to be 235° C. after starting to supply the monomer mixture solution was defined as a collection start point, from which the reaction was continued for 48 minutes to collect a macromonomer composition UM-1. During this time, 2.34 kg of the monomer mixture solution was supplied into the reactor, and 1.92 kg of the macromonomer composition was collected from the thin film evaporator. Additionally, 0.39 kg of the distillate was collected in a distillation tank.

An analysis of the distillate by gas chromatography indicated that 31.1 parts of LMA, 16.4 parts of AA, and 52.5 parts of the others including the solvent were contained in 100 parts of the distillate.

From the amount of the monomer mixture solution supplied and the composition thereof, the amount of the macromonomer composition collected, and the amount of the distillate collected and the composition thereof, a monomer conversion was calculated to be 90.2%, and a structural monomer composition ratio of the macromonomer composition UM-1 was calculated to be LMA:AA=76.0/24.0 (mass ratio).

In addition, the molecular weight of the macromonomer composition UM-1 was measured by gel permeation chromatography (hereinafter referred to as "GPC") using tetrahydrofuran as an eluate. The composition had a weight average molecular weight (hereinafter referred to as "Mw") of 3800 and a number average molecular weight (hereinafter referred to as "Mn") of 1800 in terms of polystyrene, respectively. Additionally, the concentration of terminal ethylenically unsaturated bonds in the macromonomer composition was measured by $^{1}$H-NMR measurement of the macromonomer composition. From the concentration of the terminal ethylenically unsaturated bonds obtained by the $^{1}$H-NMR measurement, the Mn obtained by the GPC, and the structural monomer composition ratio, a terminal ethylenically unsaturated bond introduction ratio in the macromonomer composition UM-1 was calculated to be 97%. In addition, 98.3% of a solid content was obtained from a heating residue after heating at 150° C. for 60 minutes.

As for the respective raw materials such as the monomers, the polymerization solvent, and the polymerization initiator, commercially available industrial products were directly used without any treatment such as purification.

Production Example 1

Production of Crosslinking Water-Absorbing Resin Particle PA-1

Polymerization was performed using a reactor that had a stirring mechanism including stirring blades and baffles and that was equipped with a thermometer, a reflux condenser, and a nitrogen introducing tube.

1.5 parts of the UM-1 and 2.0 parts of sorbitan trioleate (trade name "REODOL AO-10V", manufactured by Kao Corporation) as dispersion stabilizers, and furthermore, 395 parts of n-heptane as a polymerization solvent were charged into the reactor to prepare an oil phase in which the dispersion stabilizers were completely dissolved by stirring. The oil phase was adjusted to 15° C.

On the other hand, 100.0 parts of AA, 13.0 parts (equivalent to 2.2% by mol with respect to a monofunctional monomer) of ARONIX M-243 (polyethylene glycol diacrylate, manufactured by Toagosei Co., Ltd., average molecular weight 425), and 94.9 parts of ion exchange water were charged into another container, and uniformly dissolved by stirring. Furthermore, while cooling so that the temperature of the mixture solution was maintained at 40° C. or less, 70.8 parts of 25% aqueous ammonia was slowly added to neutralize the solution, whereby a monomer mixture solution was obtained (water: 148 parts in total).

While stirring the oil phase at a predetermined stirring speed, the monomer mixture solution was charged into the reactor to prepare a dispersion solution in which the monomer mixture solution was dispersed in the oil phase. The internal temperature of the reactor was maintained at 15° C., and the atmosphere in the reactor was replaced with nitrogen. After that, a solution prepared by dissolving 0.07 parts of sodium hydrosulfite in 2.3 parts of ion exchange water was added into the reactor. Furthermore, 3 minutes later, a solution prepared by diluting 0.03 parts of PERCUMYL H80 (an 80% solution of cumene hydroperoxide, manufactured by NOF Corporation) with 5.0 parts of n-heptane was added in the reactor. Then, an increase in the internal temperature due to polymerization heat was immediately confirmed. After having reached a peak temperature, the internal temperature was cooled to 25° C., and then, a solution prepared by dissolving 0.05 parts of sodium hydrosulfite in 1.7 parts of ion exchange water was added in the reactor. Additionally, 3 minutes later, a solution prepared by diluting 0.015 parts of PERBUTYL H69 (a 69% solution of t-butyl hydroperoxide, manufactured by NOF Corporation) with 1.5 parts of ion exchange water was added in the reactor, as a result of which the internal temperature was gradually increased due to residual monomer polymerization. After having reached a peak temperature, the internal temperature was cooled to 20° C. to obtain an in-oil dispersion solution of a crosslinking water-absorbing resin particle PA-1 (including water in the particle). After that, the reactor was heated to perform azeotropic circulation of water and n-heptane, and water was extracted through a water separator until a dewatering rate of 95% was reached. Then, a slurry in the reactor was filtered and additionally rinsed with n-heptane, followed by being heated to remove n-heptane, as a result of which a powder of the crosslinking water-absorbing resin particle PA-1 was obtained.

Table 1 shows analytical results on the obtained crosslinking water-absorbing resin particle PA-1.

Production Examples 2 to 4

Production of Crosslinking Water-Absorbing Resin Particles PA-2 to PA-4

Crosslinking water-absorbing resin particles PA-2 to PA-4 different in water-saturated and swollen particle size were obtained by changing only the stirring speed in Production Example 1. Here, when the stirring speed is increased, the water-saturated and swollen particle sizes of the obtained resin particles become small, whereas when the stirring speed is reduced, the water-saturated and swollen particle sizes become large. Table 1 shows analytical results on the crosslinking water-absorbing resin particles PA-2 to PA-4.

Production Examples 5 to 7

Production of Crosslinking Water-Absorbing Resin Particles PA-5 to PA-7

Crosslinking water-absorbing resin particles PA-5 to PA-7 different in water-saturated and swollen particle size and in amount of water absorption were obtained by changing the stirring speed and the amount of M-243 used as a crosslinking monomer in Production Example 1. Table 1 shows analytical results on the respective ones.

Production Example 8

Production of Crosslinking Water-Absorbing Resin Particle PA-8

Polymerization was performed using a reactor that had a stirring mechanism including stirring blades and baffles and that was equipped with a thermometer, a reflux condenser, and a nitrogen introducing tube.

1.5 parts of the UM-1 and 2.0 parts of sorbitan trioleate (trade name "REODOL SP-030V", manufactured by Kao Corporation) as dispersion stabilizers, and furthermore, 395 parts of n-heptane as a polymerization solvent were charged into the reactor to prepare an oil phase in which the dispersion stabilizers were completely dissolved by stirring. The oil phase was adjusted to 15° C.

On the other hand, 50.0 parts of AA, 125 parts (50.0 parts as AMD) of an acrylamide aqueous solution having a concentration of 40% (hereinafter referred to as "40% AMD"), 8.3 parts (equivalent to 1.4% by mol with respect to a monofunctional monomer) of ARONIX M-243, and 46.4 parts of ion exchange water were charged into another container, and uniformly dissolved by stirring. Furthermore, while cooling so that the temperature of the mixture solution was maintained at 40° C. or less, 35.4 parts of 25% aqueous ammonia was slowly added to neutralize the solution, whereby a monomer mixture solution was obtained (water: 148 parts in total).

While stirring the oil phase at a predetermined stirring speed, the monomer mixture solution was charged into the reactor to prepare a dispersion solution in which the monomer mixture solution was dispersed in the oil phase. The internal temperature of the reactor was maintained at 15° C., and the atmosphere in the reactor was replaced with nitrogen. After that, a solution prepared by dissolving 0.07 parts of sodium hydrosulfite in 0.23 parts of ion exchange water was added into the reactor. Furthermore, 3 minutes later, a solution prepared by diluting 0.03 parts of PERCUMYL H80 (an 80% solution of cumene hydroperoxide, manufactured by NOF Corporation) with 5.0 parts of n-heptane was added in the reactor. Then, an increase in the internal temperature due to polymerization heat was immediately confirmed. After having reached a peak temperature, the internal temperature was cooled to 25° C., and then, a solution prepared by dissolving 0.05 parts of sodium hydrosulfite in 1.7 parts of ion exchange water was added in the reactor. Additionally, 3 minutes later, a solution prepared by diluting 0.015 parts of PERBUTYL H69 (a 69% solution of t-butyl hydroperoxide, manufactured by NOF Corporation) with 1.5 parts of ion exchange water was added in the reactor, as a result of which the internal temperature was gradually increased due to residual monomer polymerization. After having reached a peak temperature, the internal temperature was cooled to 20° C. to obtain an in-oil dispersion solution of crosslinking water-absorbing resin particle PA-8 (including water in the particle). After that, the reactor was heated to perform azeotropic circulation of water and n-heptane, and water was extracted through a water separator until a dewatering rate of 95% was reached. Then, a slurry in the reactor was filtered and additionally rinsed with n-heptane, followed by being heated to remove n-heptane, as a result of which a powder of the crosslinking water-absorbing resin particle PA-8 was obtained.

Table 1 shows analytical results on the obtained crosslinking water-absorbing resin particle PA-8.

Production Examples 9 to 11

Production of Crosslinking Water-Absorbing Resin Particles PA-9 to PA-11

Crosslinking water-absorbing resin particles PA-9 to PA-11 different in water-saturated and swollen particle size and in amount of water absorption were obtained by changing the stirring speed and the amount of M-243 used as the crosslinking monomer in Production Example 8. Table 1 shows analytical results on the respective ones.

Production Example 12

Production of Crosslinking Water-Absorbing Resin Particle PA-12

A crosslinking water-absorbing resin particle PA-12 different in ionic functional group concentration and in amount of water absorption was obtained by changing the stirring speed, the monomer composition, and the amount of M-243 used as the crosslinking monomer in Production Example 8. Table 1 shows analytical results on the respective ones.

Example 1

One hundred parts of graphite powder (CGB-20, manufactured by Nippon Graphite Industries, Co., Ltd., average particle size 20 μm) as a negative electrode active material, 19.4 parts of an aqueous ammonium polyacrylate solution (trade name "ARON A-30", manufactured by Toagosei Co., Ltd., Mw 700,000, solid content 31%) as a dispersant and a binder, 2 parts of the crosslinking water-absorbing resin particle PA-1, and 120.6 parts of water as a dispersion medium were charged into a planetary mixer and mixed together. Then, 8 parts of a styrene-acrylic emulsion binder (trade name "ARON NW-7060", manufactured by Toagosei Co., Ltd., self-crosslinking type, solid content 50%) as a binder was added and furthermore mixed together to prepare a slurry composition. The present slurry composition had a solid content of 42.9%.

The slurry composition was coated on a surface of a copper foil having a thickness of 18 μm by using a film-thickness variable applicator so that a film thickness after drying was approximately 200 μm, whereby a coated film was formed. The coated film was flat in appearance and had nothing abnormal, such as streaks or unevenness. Thus, coatability was judged as A.

The coated film was dried at 60° C. for 2 minutes, and additionally at 150° C. for 5 minutes. The dried coated film was then compressed to a film thickness of approximately 100 μm by using a roll press, whereby a negative electrode mixture layer was obtained. In addition, ethylene carbonate (EC) and ethyl methyl carbonate (EMC) were mixed together in EC:EMC=1.1 (a volume ratio) to prepare a test solution.

The negative electrode mixture layer was disposed on a horizontal and flat place, and 5 μl of the test solution was dropped on a surface of the layer by using a micro-syringe. Then, the state of the test solution infiltrating into the mixture layer was observed to measure a length of time it took for the solution droplet to completely disappear from the surface. The measurement was performed three times, and the average of the measurements was defined as a solution absorption time (seconds). The solution absorption time was 24 seconds.

Additionally, the mixture layer together with the copper foil was punched out into a 5 cm×5 cm square by a puncher to form a test piece. This test piece was immersed in the test solution at 20° C. for 2 minutes and immediately taken out from the test solution. Then, the test solution adhering on the surface of the test piece was absorbed by filter paper, and immediately a weight (W1) of the test piece was measured. The test piece with the test solution absorbed in the mixture layer was heated at 150° C. for 2 hours to remove the absorbed test solution, and again, a weight (W2) thereof was measured. Separately, a weight (W0) of a copper foil punched out into a 5 cm×5 cm square by using the same puncher was measured, and the amount of retained solution (g/g) was calculated from the following formula:

$$\text{Amount of retained solution (g/g)}=(W1-W0)/(W2-W0)$$

The amount of retained solution was measured three times, and the average of the measurements was 0.34 g.

Examples 2 to 13

Production of negative electrode mixture layers and measurements of the times of solution absorption and the amounts of retained solution were performed by performing the same operations as in Example 1, except that the kind of the crosslinking water-absorbing resin particle and the amount thereof used were changed as shown in Table 2. Table 2 shows obtained results. Additionally, in Examples 8 and 12, coatability was evaluated as B, since a slight streaky unevenness was observed on a coated film when a slurry composition was coated.

Comparative Example 1

A slurry composition was produced and a negative electrode mixture layer was formed by performing the same operations as in Example 1, except that no crosslinking water-absorbing resin particle was added. Coatability was evaluated as A.

Furthermore, the time of solution absorption and the amount of retained solution were measured by the same operations as in Example 1. Table 2 shows obtained results.

Comparative Example 2

A slurry composition was produced and a negative electrode mixture layer was formed by performing the same operations as in Example 1, except that ammonium carbonate that was an inorganic pore-forming agent was used instead of the crosslinking water-absorbing resin particle. Coatability was evaluated as A.

Furthermore, the time of solution absorption and the amount of retained solution were measured by the same operations as in Example 1. Table 2 shows obtained results.

TABLE 1

| Crosslinking polymer resin particle | | Production Ex. 1 PA-1 | Production Ex. 2 PA-2 | Production Ex. 3 PA-3 | Production Ex. 4 PA-4 | Production Ex. 5 PA-5 | Production Ex. 6 PA-6 |
|---|---|---|---|---|---|---|---|
| Composition | AA | 100 | 100 | 100 | 100 | 100 | 100 |
| | AMD | | | | | | |
| | M-243 | 13.0 | 13.0 | 13.0 | 13.0 | 8.3 | 4.7 |
| | 25% Ammonia water | 70.8 | 70.8 | 70.8 | 70.8 | 70.8 | 70.8 |
| Solid content wt % | | 91.9 | 92.2 | 92.2 | 92.2 | 92.0 | 91.8 |
| Ionic functional group concentration mmol/g | | 10.6 | 10.6 | 10.6 | 10.6 | 11.0 | 11.3 |
| Water-saturated and swollen particle size µm | | 24 | 8.1 | 15 | 40 | 40 | 41 |
| Amount of water absorption ml/g | | 20 | 19 | 21 | 19 | 41 | 86 |
| Amount of particles haying a size of 425 µm or more | | 0.00% | 0.00% | 0.00% | 0.00% | 0.00% | 0.00% |
| **Crosslinking polymer resin particle** | | **Production Ex. 7 PA-7** | **Production Ex. 8 PA-8** | **Production Ex. 9 PA-9** | **Production Ex. 10 PA-10** | **Production Ex. 11 PA-11** | **Production Ex. 12 PA-12** |
| Composition | AA | 100 | 50 | 50 | 50 | 50 | 20 |
| | AMD | | 50 | 50 | 50 | 50 | 80 |
| | M-243 | 3.0 | 8.3 | 4.2 | 4.2 | 4.2 | 1.8 |
| | 25% Ammonia water | 70.8 | 35.4 | 35.4 | 35.4 | 35.4 | 14.2 |
| Solid content wt % | | 92.0 | 95.6 | 95.6 | 95.6 | 95.6 | 97.2 |
| Ionic functional group concentration mmol/g | | 11.5 | 5.9 | 6.1 | 6.1 | 6.1 | 2.6 |
| Water-saturated and swollen particle size µm | | 40 | 39 | 39 | 83 | 121 | 39 |
| Amount of water absorption ml/g | | 121 | 19 | 40 | 39 | 39 | 41 |
| Amount of particles haying a size of 425 µm or more | | 0.01% | 0.00% | 0.01% | 0.03% | 0.32% | 0.01% |

Details of the compounds used in Table 1 are shown below:

AA: acrylic acid

AMD: acrylamide

M-243: polyethylene glycol diacrylate (trade name “ARONIX M-243”, manufactured by Toagosei Co., Ltd.)

TABLE 2

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Active material | CGB-20 | 100.0 | 100.0 | 100.0 | 100.0 | 100.0 | 100.0 | 100.0 | 100.0 |
| Binder | A-30 | 19.4 | 19.4 | 19.4 | 19.4 | 19.4 | 19.4 | 19.4 | 19.4 |
| | NW-7060 | 8.0 | 8.0 | 8.0 | 8.0 | 8.0 | 8.0 | 8.0 | 8.0 |
| Crosslinking water-absorbing resin particle | Type | PA-1 | PA-1 | PA-2 | PA-3 | PA-4 | PA-5 | PA-6 | PA-7 |
| | Parts | 2.0 | 4.0 | 2.0 | 2.0 | 2.0 | 2.0 | 2.0 | 2.0 |
| Inorganic pore-forming agent | Ammonium carbonate | | | | | | | | |
| Medium | Water | 131.6 | 165.6 | 131.6 | 131.6 | 131.6 | 147.6 | 181.6 | 193.6 |
| Total | | 261.0 | 297.0 | 261.0 | 261.0 | 261.0 | 277.0 | 311.0 | 323.0 |
| Solid content value | | 42.9% | 38.4% | 42.9% | 42.9% | 42.9% | 40.4% | 36.0% | 34.7% |
| Coatability | | A | A | A | A | A | A | A | B |
| Time of solution absorption [sec] | | 24 | 12 | 23 | 18 | 28 | 21 | 22 | 32 |
| Amount of retained solution [g/g] | | 0.34 | 0.41 | 0.37 | 0.39 | 0.33 | 0.38 | 0.36 | 0.29 |
| D/L | | 0.24 | 0.24 | 0.08 | 0.15 | 0.40 | 0.40 | 0.41 | 0.40 |

TABLE 3

| | | Ex. 9 | Ex. 10 | Ex. 11 | Ex. 12 | Ex. 13 |
|---|---|---|---|---|---|---|
| Active material | CGB-20 | 100.0 | 100.0 | 100.0 | 100.0 | 100.0 |
| Binder | A-30 | 19.4 | 19.4 | 19.4 | 19.4 | 19.4 |
| | NW-7060 | 8.0 | 8.0 | 8.0 | 8.0 | 8.0 |
| Crosslinking water-absorbing resin particle | Type | PA-8 | PA-9 | PA-10 | PA-11 | PA-12 |
| | Parts | 2.0 | 2.0 | 2.0 | 2.0 | 2.0 |
| Inorganic pore-forming agent | Ammonium carbonate | | | | | |
| Medium | Water | 131.6 | 147.6 | 147.6 | 147.6 | 147.6 |
| Total | | 261.0 | 277.0 | 277.0 | 277.0 | 277.0 |
| Solid content value | | 42.9% | 40.4% | 40.4% | 40.4% | 40.4% |
| Coatability | | A | A | A | B | A |
| Time of solution absorption [sec] | | 29 | 25 | 30 | 34 | 29 |
| Amount of retained solution [g/g] | | 0.32 | 0.34 | 0.33 | 0.28 | 0.32 |
| D/L | | 0.93 | 0.93 | 0.83 | 1.21 | 0.39 |

TABLE 4

| | | Comp Ex. 1 | Comp Ex. 2 |
|---|---|---|---|
| Active material | CGB-20 | 100.0 | 100.0 |
| Binder | A-30 | 19.4 | 19.4 |
| | NW-7060 | 8.0 | 8.0 |
| Crosslinking water-absorbing resin particle | Type | — | — |
| | Parts | | |
| Inorganic pore-forming agent | Ammonium carbonate | | 2.0 |
| Medium | Water | | 127.6 |
| Total | | 255.0 | 257.0 |
| Solid content value | | 43.1% | 43.6% |
| Coatability | | A | A |
| Time of solution absorption [sec] | | 45 | 43 |
| Amount of retained solution [g/g] | | 0.24 | 0.22 |
| D/L | | — | — |

Electrodes obtained in Examples 1 to 13 are all nonaqueous electrolyte secondary battery electrodes belonging to the invention. The obtained results show that these electrodes rapidly absorbed an electrolytic solution and had favorable amounts of retained solution. In other words, with the use of the crosslinking water-absorbing resin particles, pores were formed in the electrode mixture layer, and the effect of porosification was able to be confirmed. Additionally, as shown in the Examples, the electrodes can be manufactured by the conventional electrode manufacturing process, and it is unnecessary to perform a treatment such as heating (burning) to form pores.

On the other hand, in Comparative Example 1 using no crosslinking water-absorbing resin particle and Comparative Example 2 using the inorganic pore-forming agent, the time of absorption of the electrolytic solution and the amount of retention thereof were insufficient.

INDUSTRIAL APPLICABILITY

The nonaqueous electrolyte secondary battery electrode of the invention is excellent in speed of absorption of an electrolytic solution and in amount of retention thereof, and application of the electrode to nonaqueous electrolyte secondary batteries allows for achievement of high power (high power density) of the batteries. Furthermore, according to the method of manufacturing a nonaqueous electrolyte secondary battery electrode of the invention, a high performance electrode can be manufactured at low cost with high productivity.

REFERENCE SIGNS LIST

1 Burette
2 Pinch cock
3 Silicone tube
4 Polytetrafluoroethylene tube
5 Funnel
6 Sample (polymer particle)
7 Sample (polymer particle) fixing filter paper
8 Support cylinder
9 Adhesive tape
10 Device filter paper
11 Lid
12 Ion exchange water

The invention claimed is:

1. A nonaqueous electrolyte secondary battery electrode comprising a mixture layer formed from a slurry including an active material, a crosslinking water-absorbing resin particle, a binder, and water, on a current collector surface, wherein the crosslinking water-absorbing resin particle has an amount of water absorption of from 3 ml/g or more, the crosslinking water-absorbing resin particle includes an ionic functional group in an amount of from 2.6 mmol/g or more, and a value (D/L) calculated from a particle size (D) of the crosslinking water-absorbing resin particle saturated and swollen with ion exchange water and a mixture layer thickness (L) is in a range of from 0.01 to 2.0.

2. The nonaqueous electrolyte secondary battery electrode according to claim 1, wherein the crosslinking water-absorbing resin particle has an amount of water absorption of from 3 to 100 ml/g.

3. The nonaqueous electrolyte secondary battery electrode according to claim 2, wherein the crosslinking water-absorbing resin particle has an amount of water absorption of from 10 to 100 ml/g.

4. The nonaqueous electrolyte secondary battery electrode according to claim 1, wherein the crosslinking water-absorbing resin particle includes an ionic functional group in an amount of from 2.6 to 15 mmol/g.

5. The nonaqueous electrolyte secondary battery electrode according to claim 1, wherein the crosslinking water-absorbing resin particle has a structural unit constituted from (meth)acrylic acid or (partially) alkali-neutralized products thereof.

6. The nonaqueous electrolyte secondary battery electrode according to claim 5, wherein the crosslinking water-absorbing resin particle further has a structural unit constituted from acrylamide.

7. The nonaqueous electrolyte secondary battery electrode according to claim 1, wherein the mixture layer is porous.

8. A nonaqueous electrolyte secondary battery comprising the nonaqueous electrolyte secondary battery electrode according to claim 1, a separator, and a nonaqueous electrolytic solution.

9. A method of manufacturing a nonaqueous electrolyte secondary battery electrode, the method comprising the steps of:

coating a slurry including an active material, a crosslinking water-absorbing resin particle, a binder, and water, on a current collector surface;

drying the slurry to form a mixture layer; and then compressing the mixture layer, wherein the crosslinking water-absorbing resin particle has an amount of water absorption of from 3 ml/g or more, the crosslinking water-absorbing resin particle includes an ionic functional group in an amount of from 2.6 mmol/g or more, and a value (D/L) calculated from a particle size (D) of the crosslinking water-absorbing resin particle saturated and swollen with ion exchange water and a mixture layer thickness (L) is in a range of from 0.01 to 2.0.

* * * * *